UNITED STATES PATENT OFFICE.

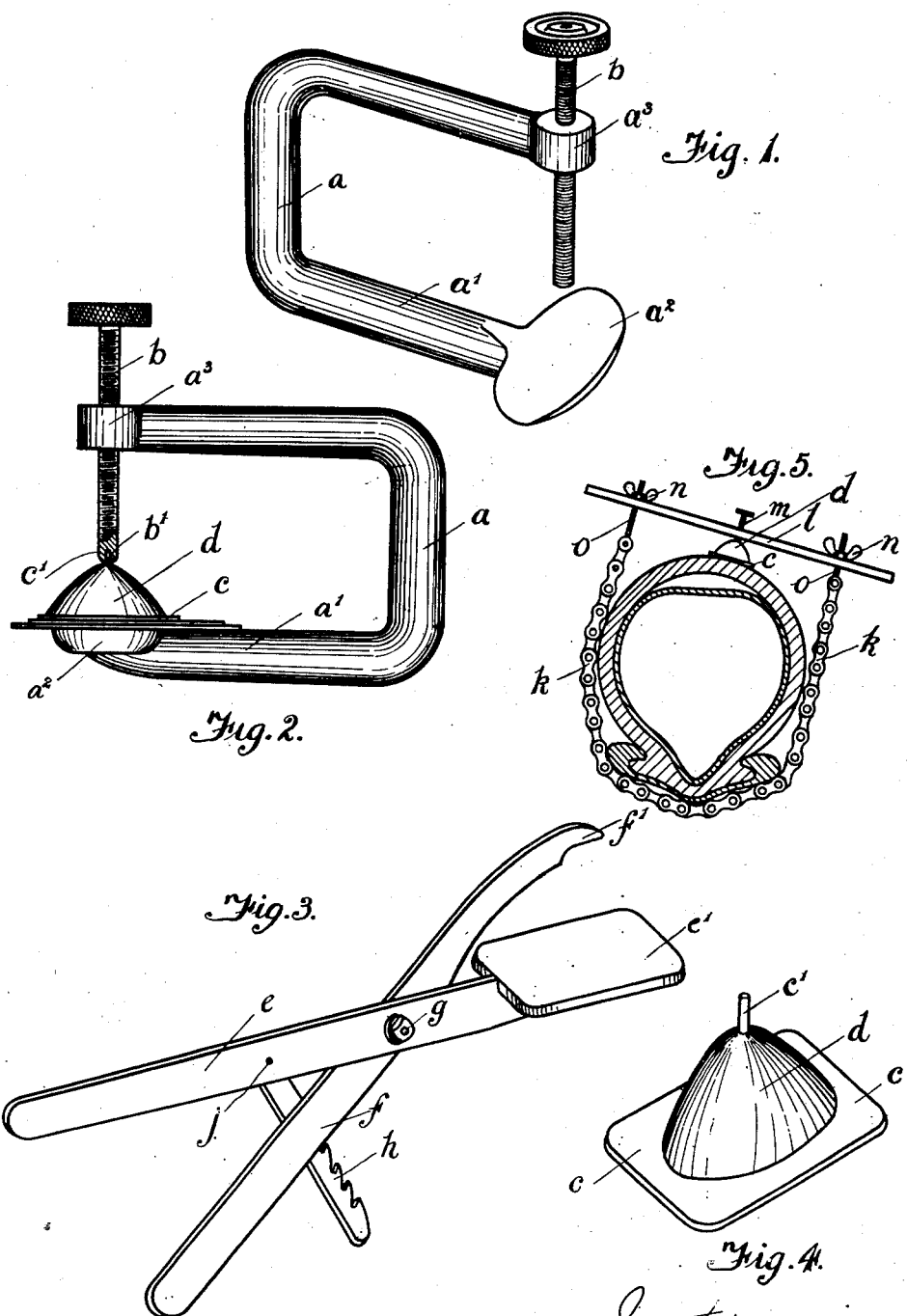

WILLIAM HENRY MILES, OF LONGTON, ENGLAND.

VULCANIZING APPARATUS FOR REPAIRING RUBBER TIRES AND OTHER ARTICLES.

1,168,820.  Specification of Letters Patent.  Patented Jan. 18, 1916.

Application filed February 15, 1915. Serial No. 8,298.

*To all whom it may concern:*

Be it known that I, WILLIAM HENRY MILES, subject of the King of Great Britain, residing at Woolpack Hotel, Longton, in the county of Stafford, England, have invented a new and useful Improvement in Vulcanizing Apparatus for Repairing Rubber Tires and other Articles; and I do hereby declare the following to be a full, clear, and exact description of the same.

This invention relates to apparatus for vulcanizing for the purpose of repairing rubber tires and other articles of rubber, and has for its object to provide improvements in such apparatus.

The object of my invention is more especially to provide more compact, portable and convenient means of heating the raw rubber when the same has been placed in the puncture or like, and the parts clamped together. Accordingly I provide heating means comprising a cake or block of slow burning heat-producing substance of predetermined heat producing capacity adapted to ignite in the atmosphere upon the application of a lighted match and to be disposed upon a plate (preferably of copper) which is held against the part to be vulcanized.

My invention comprises, moreover, complete apparatus by means of which the tire or like to be vulcanized may be clamped against the plate during the vulcanizing process.

Referring to the accompanying drawings:—Figure 1, is a perspective view showing a form of clamp adapted to be used for vulcanizing in accordance with my invention. Fig. 2, is an elevation of the same with the plate and combustible block in position. Fig. 3, is a perspective view of a modified form of clamp. Fig. 4, shows detached the plate and combustible block common to both forms of clamps. Fig. 5, shows means whereby the apparatus may be employed upon the outer covers of tires while in position.

In carrying my invention into practice as illustrated upon the accompanying drawings at Figs. 1 and 2, a clamp or cramp $a$ is provided, of size adapted to embrace the article to be repaired. For tires the clamp may be one or two inches high, and adapted to inclose rather more than one half of the perimeter of the tube. The lower limb $a^1$ may be terminated by a flat plate $a^2$ or the like, the upper limb having a screw-threaded hole in a boss $a^3$ fitted with a clamping screw $b$, and the parts being made of a casting or stamping, though any suitable form of clamp may be employed.

In the lower end of the clamping screw I form a recess $b^1$ adapted to engage the top of a pin $c^1$ disposed vertically upon the metal plate $c$, and the said plate is in this manner clamped firmly in position upon the part desired. Before the plate is placed in position under the clamping screw I place upon it the heating block or cake $d$, which may be perforated to pass over the pin, and may be of semispherical or other convenient shape and may be of a pliable nature. The block may, by way of example, be composed of a mixture of charcoal, saltpeter, cascarilla or other scented bark, glass and gum or of other material such as is employed for the manufacture of Vesuvian or fusee matches, but preferably with a larger proportion of carbon than is usually so employed. Preferably the cake is of such size that the rubber is vulcanized to the desired extent by the time the combustion of the cake is complete or the fuse may be made of a good heat giving substance and a quicker duration of combustion so that it transmits the heat to the metal plate which again does the required amount of vulcanizing, and it may be provided with a patch of brimstone or other substance near its lower edge to start the combustion.

By way of example the blocks may be composed according to three specific examples of the following ingredients in the proportions given:—

*Example 1.*

| | |
|---|---|
| Potassium nitrate | 25 grs. |
| Acacia gum | 20 grs. |
| Potassium chlorate | 5 grs. |
| Charcoal | 8 grs. |
| Cascarilla | 10 grs. |
| Glass (ground) | 9 grs. |
| Plaster Paris | 10 grs. |
| Wood dust | 8 grs. |
| Venetian red | 10 grs. |

Example 2.

| | |
|---|---|
| Wood dust | 3 drs. |
| Potassium nitrate | 30 grs. |
| Tragacanth | 5 grs. |
| Acacia gum | 5 grs. |

Example 3.

| | |
|---|---|
| Charcoal | 224 grs. |
| Coarse prunella | 256 grs. |
| Potassium chlorate | 32 grs. |
| Infusorial earth | 160 grs. |
| Acacia gum (dry) | 120 grs. |
| Water | 5 drs. |

All these fuses must be dried at a temperature not exceeding 72 deg.: no forced draft or heat must be used.

In the modification shown at Fig. 3 in place of employing a clamping screw the clamp comprises a pair of members $e$ and $f$ pivoted together at $g$. One terminates in a flat plate portion $e^1$ and the other in a recessed or slotted portion $f^1$ in which the pin $c^1$ of the metal plate $c$ may engage. A toothed arm $h$ pivoted at $j$ is adapted to engage with a projection upon the arm $f$, and by causing different teeth to engage therewith the clamp may accommodate articles of varying thickness.

The heating blocks being of a definite predetermined size, and arranged to burn slowly, all risk of burning the tire is avoided—it is well known that with vulcanizers of the form now used the operation is very liable to burn the tire, owing to the difficulty of properly regulating the heating medium—usually in the form of a valve controlled gas flame, oil or methylated spirit. These heating blocks and the other apparatus are very portable, and can be readily used for making roadside repairs, as the apparatus is self contained and quite automatic. The appliance may also be adapted for use in vulcanizing outer covers in which case it is provided with a chain $k$ which encircles the wheel and a bridge $l$ across the tread of the tire carrying the clamping screw $m$ and two wing nuts $n$ and screwed pins $o$ which by tensioning the chain serve to apply pressure to the plate.

I wish it to be understood that I do not desire to restrict the scope of my invention to the precise forms shown, but to include other forms within the spirit of the invention and within the scope of the claims.

Claims:

1. In vulcanizing apparatus the combination of a clamping device comprising two jaws; a metal plate upon one of said jaws; a second metal plate adapted to be pressed toward said first metal plate by the second of said jaws; a block of slow-burning heat producing substance; and means for retaining said block upon said second metal plate.

2. In vulcanizing apparatus the combination of a block of slow-burning heat producing substance, having a hole through it; a metal plate provided with a pin upon which said block is adapted to be placed; and means for holding said plate against the part that is to be vulcanized.

3. In vulcanizing apparatus the combination of a perforated heating block; a removable plate; a pin upon said plate adapted to retain said block; and means for applying said plate to the part that is required to be vulcanized.

4. In vulcanizing apparatus the combination of a block of slow burning heating material such as is employed in Vesuvian matches; a metal plate upon which said block is disposed; and means for holding said plate against the part that is to be vulcanized.

5. In vulcanizing apparatus the combination of a clamp; a removable plate; a perforated heating block; and a pin upon said plate adapted to retain said block and to be acted upon by said clamp.

6. In vulcanizing apparatus the combination of a clamp including two limbs; a metal plate upon one of said limbs; a recessed portion upon the second of said limbs; means for tightening said clamp; a removable copper plate; a perforated heating block; and a pin upon said plate adapted to retain said block and to be engaged by the said recessed portion of the second of said limbs.

In testimony whereof I affix my signature in presence of two witnesses.

WILLIAM HENRY MILES.

Witnesses:
HAROLD C. HONESTER,
E. L. W. BYRNE.